UNITED STATES PATENT OFFICE.

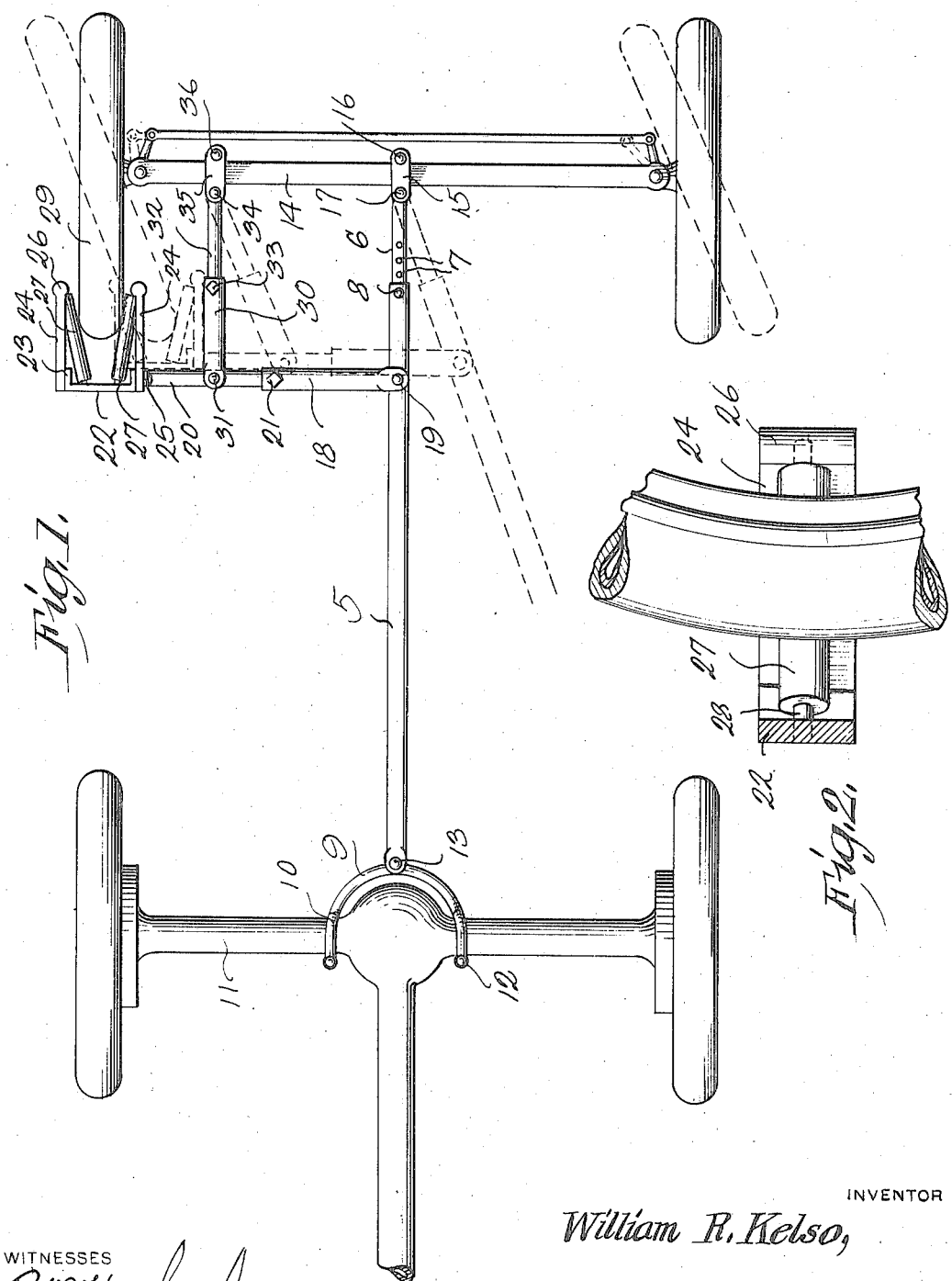

WILLIAM RAYMOND KELSO, OF VINTON, IOWA.

AUTOMOBILE-PULLER.

1,286,342.   Specification of Letters Patent.   Patented Dec. 3, 1918.

Application filed April 6, 1918.   Serial No. 227,053.

*To all whom it may concern:*

Be it known that I, WILLIAM R. KELSO, a citizen of the United States, residing at Vinton, in the county of Benton and State of Iowa, have invented certain new and useful Improvements in Automobile - Pullers, of which the following is a specification.

This invention is an automobile puller and has for its principal object the production of a structure which will facilitate the connection of an automobile to a pulling machine, thus facilitating the drawing of the disabled automobile from a stalled position, to a place where the same may be repaired.

Another object of this invention is the production of an automobile puller which consists of a frame so constructed as to enable the connection between two automobiles, the frame being adapted to swing, to have its various elements moved to steer the vehicle which is being pulled.

Another object of this invention is the production of an automobile puller wherein the frame comprises a plurality of adjustable connecting elements, thus allowing the device to be used upon automobiles of various sizes.

Another object of this invention is the production of an automobile puller consisting of an adjustable frame, wherein the reach pole is connected to the front axle of the disabled machine and the rear axle of the pulling machine, while the steering mechanism is arranged to engage the tire of one of the front wheels of the disabled machine to facilitate the movement of the machine without danger of injuring the tire although so engaging the tire as to shift the front wheels of the disabled machine for steering the same.

With these and other objects in view, this invention consists of certain novel combinations, constructions, and arrangement of parts as will be hereinafter fully described and claimed.

One practical form of construction and assembly of the present invention will be hereinafter described and is illustrated in the accompanying drawing, in which—

Figure 1 is a top plan view of the automobile puller, illustrating the manner in which the same is used, and Fig. 2 is a sectional view through the housing in which fits a front wheel of the disabled machine, illustrating a portion of the tire and felly to show the manner in which the rollers of the steering mechanism engages the tire.

In the preferred embodiment of the present invention, about to be described, it will be noted that the frame of the automobile puller comprises the reach pole consisting of an elongated sleeve 5 which is hollow and has the tube 6 extending thereinto. This tube 6 is provided with openings 7, through which the bolt 8 carried by the sleeve 5 extends, as shown in Fig. 1. Therefore, it is obvious that the tube may be telescoped within the sleeve 5 and these two elements may then be retained in a set engagement with each other.

The yoke 9 may be provided with forked ends 10 to fit upon the rear axle casing 11 of the pulling machine and suitable retaining elements 12 may be passed through the forked ends for holding the yoke 9 in engagement with this axle casing 11. The sleeve 5 is attached to the yoke 9 by a bolt or other securing elements 13, thus pivotally supporting this sleeve in engagement with this yoke.

If so desired the pulling car may be used as a "wreck" car, and for this reason the yoke 9 may be permanently left upon the axle casing 11 and the remainder of the frame of the automobile puller may be detached from engagement with the yoke by the removal of the bolt 13.

In order to connect the rear portions of this reach pole with the front axle 14 of the disabled car, there is provided a link 15 which is secured by a bolt 16 around the front axle 14, while the forward portions of this link 15 are pivotally mounted, as indicated at 17 upon the rear or outer end of the tube 6. Therefore, it is obvious that when the device is connected as above specified, the disabled car may be pulled forwardly by the movement of the pulling car.

For the purpose of steering the disabled car, without necessitating such steering by a chauffeur, there is provided a steering frame. This steering frame consists of a sleeve 18 having one end pivotally mounted as indicated at 19 upon the sleeve 5 of the reach pole. The tube 20 has one end extending into the sleeve 18 and is therefore telescopically mounted upon this sleeve. In order to hold the sleeve and tube in set position, there is provided a set screw 21, which passes through the sleeve into engagement with the tube.

The wheel housing comprises a front wall 22 having flanges 23 on its ends, as illustrated in Fig. 1. The side walls 24 are secured in any suitable manner upon these flanges 23 and for this reason these side walls 24 extend entirely in parallel relation. The outer end of the tube 20 is secured as indicated at 25 to one of the side walls, thus fixedly supporting the wheel housing upon the outer end of the tube 20. The rear ends of the walls 24 are thickened as indicated at 26. The guide rollers 27 have shafts 28 extending therethrough and the ends of these shafts 28 are journaled in the front wall 22 of the housing, and the rear ends of these shafts are journaled in the thickened portion 26 of the side walls 24. Therefore, it will be seen that these rollers converge toward their forward ends to provide an enlarged entrance adjacent their rear ends. Accordingly the tire 29 of one of the front wheels of the disabled car will be extended in between the rollers 27 as indicated in Fig. 1.

In order to hold the wheel housing in position to cause the rollers thereof to swing the tire 29, there is provided a brace consisting of the sleeve 30 suitably mounted by a bolt or other securing member 31, upon the tube 20. The tube 32 is telescopically mounted upon the sleeve and is held in a set position by means of the set screw 33. The outer end of this tube 32 is pivotally mounted by the bolt or pin 34 upon the forward end of the link 35. This link 35 is connected to the front axle 14 of the disabled car and is held in engagement therewith by a bolt 36.

When the pulling automobile is moved into a position directly in front of the disabled automobile the sleeve 5 is then attached to the yoke 9, and the frame is then in position to be applied to the disabled car. The set screws 21 and 33 may be removed while the bolt 8 is withdrawn, thus allowing the tubes 6, 20 and 32 to be moved outwardly or inwardly according to the size of the automobile to be moved. The housing may be slipped over the periphery of the wheel to allow the tire to be engaged by the diagonal rollers 27 and the links 15 and 35 may then be secured to the front axle 14 of the disabled automobile. The set screws 21 and 13 may be tightened while the bolt 8 may be passed through a selected opening, thus firmly connecting the frame to the disabled automobile. Therefore, as the pulling automobile moves forwardly, it will draw the disabled automobile through the connection of the reach pole with the yoke 9 and the link. When it is necessary to change the course of movement and the pulling automobile moves in the arc of a circle or in any other manner, it is obvious it will swing the reach pole. The sleeve 30 and the tube 32 are normally parallel to the sleeve 5 and tube 6 and when the reach pole is swung to one side, as indicated in dotted lines in Fig. 1, this brace will also be swung to still maintain a parallel relation with the reach pole. This will shift the wheel housing to one side, although the supporting frame of this wheel housing will still be maintained in its parallel relation with the front axle of the disabled car. Owing to the diagonal arrangement of the rollers 37 however, these rollers will not bind upon the front wheel of the disabled car but will permit the front wheel of the car to be shifted, as indicated in dotted lines in Fig. 1, thus causing the frame to steer the disabled car as well as pull the same.

From the foregoing description it will be seen that an automobile puller has been constructed which comprises a frame consisting of a plurality of telescoped sections, thus permitting the device to be applied to automobiles of various sizes. It will also be noted that the wheel housing is so arranged as to prevent injury to a tire passing therethrough although it is constructed so as to positively steer the disabled car. Although the device may have the various set screws and bolts engaged to properly hold the same upon the disabled car, the entire frame may be easily disassembled or collapsed to require only a minimum amount of space when the same is not in use and as the greatest strain is placed upon the reach pole, it is obvious that if so desired the support of the wheel housing need not be as large as the construction of the reach pole.

It should be understood that by having the guide rollers arranged in a converging manner within the steering frame housing, wheels of various sizes may be inserted therein. Also, when the wheels are being swung, as indicated in dotted lines in Fig. 1, the manner in which the rollers extend will permit of free movement of the wheels without the binding action thereon. Also, the disabled machine may be guided as well as towed by the pulling machine, without the necessity of a chauffeur for steering the disabled machine. Attention is furthermore specifically invited to the fact that by having the rollers at all times firmly binding upon the tire, of a wheel of the disabled machine, the disabled machine will be steadily guided during its journey. Furthermore, when so desired the tubes may be telescoped within the sleeves and the entire device folded to extend in a substantially straight and compact arrangement.

The foregoing description and the drawings have reference to what may be considered the preferred, or approved, form of my invention. It is to be understood that I may make such changes in construction and arrangement and combination of parts, materials, dimensions, et cetera, as may prove expedient and fall within the scope of the appended claims.

Having thus fully described my invention, what I claim as new and desire to secure by Letters Patent, is:—

1. An automobile puller comprising a reach pole, a support carried by said reach pole, a brace connected to said support, axle attaching means directly connected to the opposite ends of the reach pole and to said brace, a wheel housing supported by the end of said support and anti-friction means carried by said wheel housing.

2. An automobile puller comprising a reach pole, a support connected to said reach pole, a brace connected to said support, axle attaching means connected directly to the end of said reach pole and said brace, a U-shaped wheel housing carried by the end of said support, and diagonally extended guide rollers carried by the sides and forward portions of the wheel housing, whereby wheels of various sizes may be accommodated and room provided for the proper swinging of the wheel.

3. An automobile puller comprising a telescopic reach pole, axle attaching elements directly connected to the ends of the reach pole, a telescopic support pivotally mounted upon said reach pole, a telescopic brace pivotally mounted upon said support, axle attaching means carried by said brace, a U-shaped wheel housing fixed upon said support, and guide rollers rotatably journaled upon the side and forward portions of the housing, thus causing the rollers to converge toward the forward portions of the housing, whereby various sized wheels may be accommodated and properly swung without binding action upon the rollers, said reach pole support and brace being capable of being swung into a compact folded condition when not in use.

In testimony whereof I affix my signature in presence of two witnesses.

WILLIAM RAYMOND KELSO.

Witnesses:
R. M. KELSO,
G. M. DELFS.